Oct. 14, 1969  E. KOENIG  3,473,148
SAFETY TWINKLE LAMP
Filed Feb. 23, 1968

INVENTOR
*Earl Koenig*

3,473,148
SAFETY TWINKLE LAMP
Earl Koenig, 35 Collins St., West Seneca, N.Y. 14224
Filed Feb. 23, 1968, Ser. No. 707,752
Int. Cl. B60q 1/26
U.S. Cl. 340—87                                          1 Claim

ABSTRACT OF THE DISCLOSURE

A device for warning oncoming drivers that a vehicle he does not see because of obstructions is backing out of a driveway or other area, the device having a blinking light secured to a telescoping structure which may be raised or lowered or tilted rearwards. This device is composed of a circuit which is closed when the vehicle is placed in reverse and includes a flasher to allow the bulb on its extended end to continuously blink while the vehicle is in reverse.

SPECIFICATION

This invention relates to vehicular warning devices, and more particularly to a device which will warn oncoming drivers that the vehicle carrying this device is moving backwards.

It is therefore the main purpose of this invention to provide a twinkle lamp device which will be mounted on the upper extremity of a telescoping antenna-like structure which will extend above hedges, parked cars, trucks and the like in order to warn the oncoming driver who does not see the vehicle that there is a vehicle present and backing out of his position in the obstructed area.

Another object of this invention is to provide a twinkle lamp which will have a base member of such construction so as to allow for the vertical telescoping portion of the device to be tilted rearwards or otherwise thus serving as an advance warning when the driver of the vehicle containing the device is traveling rearwards.

A further object of the present invention is to provide a twinkle lamp device which will be electrically connected to the flasher of the vehicle and to the rearward position of the shift stick of the vehicle.

Other objects of the present invention are to provide a twinkle lamp which is simple in design, inexpensive to manufacture, rugged in construction, easy to use and efficient in operation.

These and other objects will be readily evident upon a study of the following specification and the accompanying drawing wherein.

Figure 1:
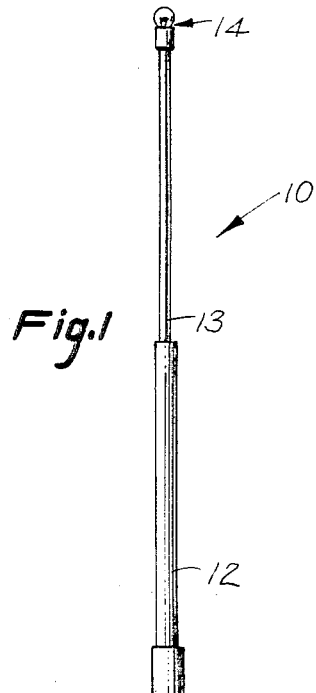
FIGURE 1 is a vertical view of the present invention shown partly broken away.
Figure 2:
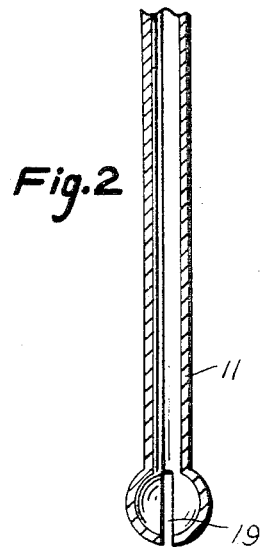
FIGURE 2 is a fragmentary side view of the bulb and base vertical portion of the device shown in elevation and in section.
Figure 3:
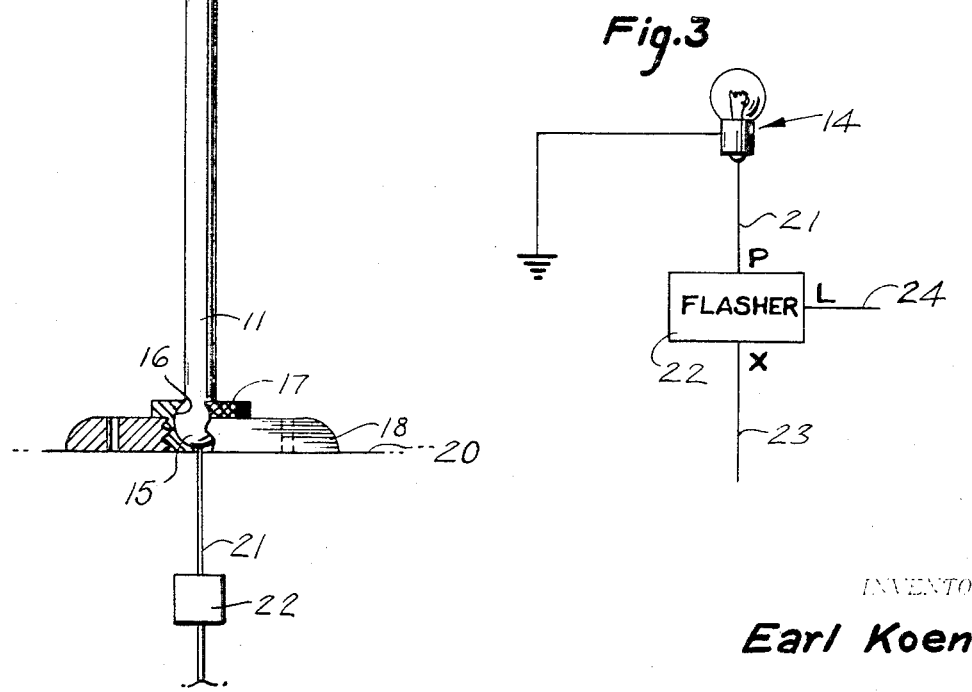
FIGURE 3 is a diagrammatic view showing the bulb and flasher connections.

According to the present invention, a safety twinkle lamp 10 is provided with a hollow sleeve 11 which telescopingly receives a sleeve 12 and which in turn telescopingly receives an upper sleeve 13 which is attached to a lamp 14. Sleeve 11 is provided with a hollow ball shaped and slotted end 15 which is received within a spherical socket 16 of an externally fitted bushing 17, bushing 17 being threaded into base 18. Base 18 of circular configuration is secured to the outer surface 20 of the vehicle (not shown) by a suitable fastener means (not shown).

Wire 21 exends through sleeves 11, 12, 13 and is electrically secured to lamp 14, the base of which is grounded to the vehicle. The other end of wire 21 is electrically secured to flasher unit 22. Wire 23 is connected to the x terminal of flasher 22 at one end and is connected to the back up wire in the trunk of the vehicle (not shown). Wire 24 is connected to the L terminal of flasher 22 and the other end is connected to the terminal on the fuse box of the vehicle marked up back up lights.

It will be noted that the socket of lamp 14 is grounded to the top of the mass portion of the device which is grounded to the rear fender.

In operation, safety twinkle lamp 10 indicates to oncoming motorists and pedestrians alike that the operator of the vehicle has the stick shift in reverse gear and the motor is running. This indicates that the operator wishes to back up so the motorists and the pedestrians will be warned to use caution. This device is operated day or night and thus tends to reduce the possibility of accidents on the road and near the home and the antenna-like portion of the device is adjusted to several positions, the same as the radio antenna of the vehicle and may be tilted to the rear and remains flashing until the stick shift is removed from the reverse gear.

What I now claim is:

1. A safety twinkle lamp for motor vehicles, comprising in combination, a base providing mounting means, a threaded bushing carried by said base providing mounting means for the lower end of a hollow lower sleeve, and a pair of telescoping sleeves carried upwardly of said lower sleeve in order to raise or lower a lamp at the upper extremity of and uppermost of said sleeves, a lamp and flasher carried by said device providing suitable warning means to on-coming motorists and pedestrians that the vehicle carrying said device is ready to travel in reverse, said base being secured to the rearward outer surface of a suitable part of a vehicle by suitable fastening means, said bushing threaded into said base is provided with a spherical hollow socket, said socket receiving a slotted ball integral with said lower end of said lower sleeve, and said lower sleeve being allowed to be rotated rearwards of said vehicle to serve as an advance warning to on-coming motorists and vehicles that said vehicle carrying said device is in reverse, said telescoping sleeves receiving a wire therethrough, said wire being secured to a terminal of a flasher of said vehicle and a base portion of said lamp secured at the upper extremity of said upper telescoping sleeve, all of said sleeves being grounded through said base, and a wire secured to the center terminal of said lamp extending through said sleeve and being connected to the terminal of said flasher.

References Cited

UNITED STATES PATENTS

| 2,252,395 | 8/1941 | Cohen. |
| 2,938,109 | 5/1960 | Coleman _____ 340—87 X |
| 3,143,722 | 8/1964 | Murch _____ 340—87 X |
| 3,197,552 | 7/1965 | Flair _____ 343—715 |

FOREIGN PATENTS

| 235,943 | 6/1919 | Australia. |

JOHN W. CALDWELL, Primary Examiner

MICHAEL R. SLOBASKY, Assistant Examiner

U.S. Cl. X.R.

340—91, 119, 331